July 7, 1942.　　　　M. F. HOUSE　　　　2,289,120
GAUGE
Filed July 3, 1940
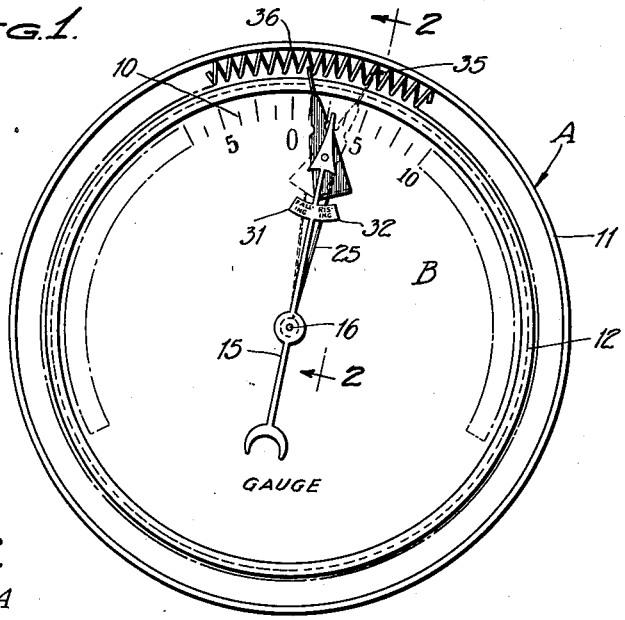
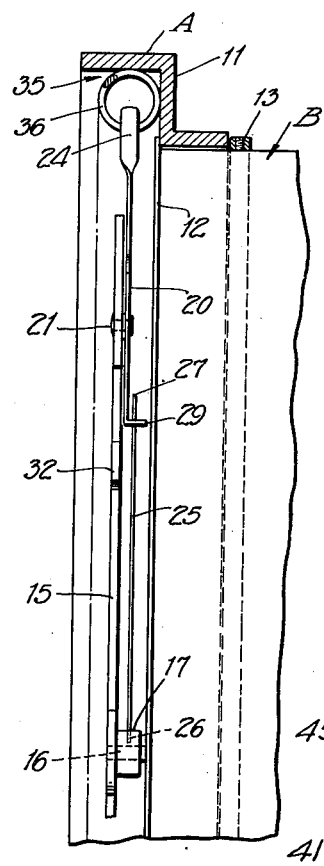
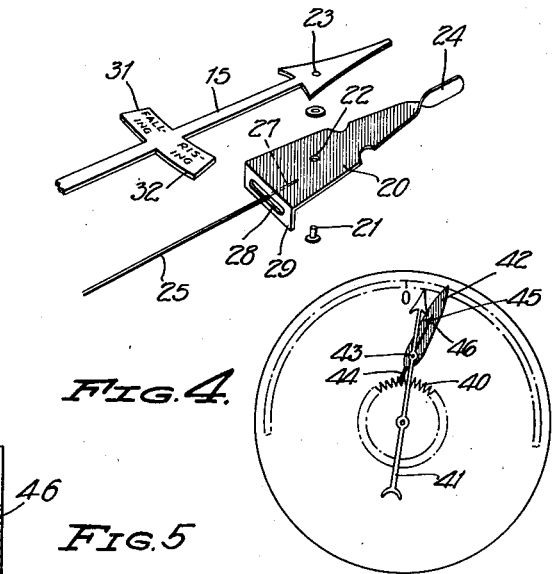
MANSFIELD F. HOUSE.
INVENTOR.
BY Ely Pattison
ATTORNEYS.

Patented July 7, 1942

2,289,120

UNITED STATES PATENT OFFICE 2,289,120

GAUGE

Mansfield F. House, Greenwich, Conn.

Application July 3, 1940, Serial No. 343,679

7 Claims. (Cl. 116—129)

This invention relates to new and useful improvements in gauges and similar instruments of the type which embody an indicating hand movable with respect to calibrations upon a calibrated dial.

One object of the present invention is to improve the construction and mode of operation of instruments of the aforementioned type and it is to provide such instruments with means for indicating both the direction and extent of movement, within certain limitations, of the indicating hand.

A feature of the invention resides in the provision of a novel direction indicating means for indicating the direction of movement of the indicating hand of an instrument of the aforementioned type.

It is a further feature of the invention to provide novel means whereby the extent of movement, within certain limitations, as well as the direction of movement of the indicating hand may be determined, merely by glancing at the instrument.

It is a further feature of the invention so to construct the several parts that the indicating hand and the direction indicating hand may be from time to time reset or adjusted as desired.

I have chosen to illustrate the invention in connection with a barometer of the so-called "Aneroid" type but it will be obvious that the invention is equally capable of use in connection with any type of gauge or instrument wherein an indicating hand is movable with respect to a calibrated dial and this is true whether the indicating hand be pivotally mounted for rotatory movement relative to the calibrations or whether it has sliding movement relative to the calibrations.

In the accompanying drawing,

Figure 1 illustrates a view in elevation of a barometer or similar instrument dial having an indicating hand and direction indicating hand carried thereby, constructed in accordance with the present invention, Figure 2 is a fragmentary sectional view on an enlarged scale taken substantially on the line 2—2 of Figure 1, Figure 3 is a distended perspective view of the indicating hand and the direction indicating hand, Figure 4 is a more or less diagrammatic view illustrating a slightly modified form of the invention and, Figure 5 is a longitudinal sectional view on an enlarged scale taken through the mounting of the direction indicating hand.

Referring to the drawing by reference character, A designates a barometer or gauge housing which may be of any particular type having a dial B. The dial B is provided with calibrations 10 of any desired character.

The reference character 11 designates a bezel ring or the like which carries the ordinary crystal or cover glass, not herein illustrated. This bezel ring may be Z-shaped in cross section as shown and is mounted on the housing A between a flange 12 and a circular band or the like 13 in such a manner that the housing A and bezel 11 are capable of rotating movement relative to each other.

The reference numeral 15 designates the indicating hand of the instrument which may be of any desired shape and said hand is mounted upon a spindle 16 and operated by any type of mechanism, controlled by varying conditions of any type. Such a mechanism is not herein illustrated since it is not in itself, a part of the present invention.

The indicating hand 15 is carried by the spindle 16 in spaced relation to the dial B and in the present embodiment of the invention, the indicating hand 15 is provided with a hub member 17 for attachment to the spindle 16.

The construction and arrangement is such that responsive to varying conditions, the indicating hand 15 moves relatively to the calibrations 10 in order to give a reading as to the extent of movement of said indicating hand.

Under varying conditions, the indicating hand may, for periods of time, move alternately in opposite directions and unless some means is provided to mark the starting point of the indicating hand, one has to depend on memory to determine both the direction of movement of the hand or the extent of such movement.

As ordinarily constructed this type of instrument is provided with a manually operated pointer which is from time to time, as the readings are taken, moved manually into parallelism with the indicating hand. After the pointer and hand have been set in parallelism, movement of the indicating hand can be determined between its relative position with respect to the pointer and after the reading is taken the pointer is again set manually.

In the device of the present invention, means is provided whereby the direction of movement of the indicating hand may be determined without necessitating the manual operation above described, and the extent of such movement within limitations, may also be determined.

In carrying out the present invention, I provide a direction indicating hand which is designated 20 in the drawing. This direction indicating hand is pivotally attached to the indicating hand 15 by means of a pivot 21 which passes through an opening 22 in the direction indicating hand and an opening 23 in the head of the indicating hand 15. By this construction, the direction indicating hand is pivotally attached to the indicating hand 15 preferably beneath the same as illustrated in the drawing. The direction indicating hand 20 has an extension 24 which extends beyond the adjacent free end of the indicating hand 15, the purpose of which extension will be hereinafter described.

Means is provided to restrict or limit the pivotal action of the direction indicating hand 20 about its pivotal point and this means includes a resilient element 25 in the form of a highly sensitive spring which is attached at one end as at 26 to the hub member 17 heretofore described. The opposite end of this spring which is designated 27 in the drawing passes through an elongated opening 28 in a flange 29 which extends from the inner end of the direction indicating hand 20 as best illustrated in Figure 3 of the drawing.

The indicating hand 15 may be provided with two lateral extensions 30 and 31 which extensions bear respectively the designations "Falling" and "Rising."

As heretofore stated, the extension 24 of the direction indicating hand 20 projects beyond the adjacent free end of the indicating hand 15. This construction is employed in order that the said extension may have engagement with any one of a plurality of stops arranged in the path of movement of the extension 24 as it is moved by reason of movement of the indicating hand 15.

The reference numeral 35 designates a coil spring which is rigidly carried by the bezel ring 11 and is secured thereto in such a manner that its individual convolutions 36 will lie in spaced relation to one another in the path of travel of the extension 24 of the direction indicating hand 20 to provide the stops therefor, heretofore mentioned.

The coil spring 35, the convolutions 36 of which form the spaced stops heretofore mentioned, being carried by the bezel ring 11, which, as heretofore mentioned, is freely rotatable upon the housing A, is movable relative to the dial B and the calibrations 10 carried thereby, and the purpose of this construction and arrangement will be hereinafter more specifically set forth.

In order to describe the operation of the device of the invention, we will assume that the instrument is a barometer, that the indicating hand 15 and the direction indicating hand 20 are arranged in alinement with each other and that both are positioned at the point zero (0), of the calibrations on the dial.

As the barometer rises the indicating hand 15 moves in a clockwise direction in Figure 1. By reason of the engagement of the extension 24 of the direction indicating hand 20 with the convolution coinciding with the zero mark of the calibration, movement of the indicating hand 15 will merely rock the direction indicating hand 20 about its pivotal point upon the indicating hand 15. As movement of the indicating hand 15 in a clockwise direction continues, the angularity between the indicating hand 15 and the direction indicating hand 20 will increase until such time as the resilient element 25 engages the right hand end of the elongated slot 28. From this point on, the resilient element 25 is placed under tension and will yield sufficiently to permit the extension 24 of the direction indicating hand 20 to pass by the convolution of the spring with which it was engaged into engagement with the next adjacent convolution in a clockwise direction. It will be noted that the inner end of the direction indicating hand 20 coincides with the lateral extensions 31 and 32 on the body portion of the indicating hand 15 and as illustrated in Figure 1 of the drawing if the movement of the indicating hand 15 is in a clockwise direction, the inner end of the direction indicating hand 20 will be moved to the right to coincide with the lateral extension 32 bearing the legend "Rising" thus indicating that the movement of the indicating hand 15 was in a clockwise direction.

If now the movement were to cease in a clockwise direction and conditions were such that the indicating hand 15 were moved in a counterclockwise direction, the direction indicating hand 20 would maintain its position in contact with the last convolution of the spring with which it was engaged until the extent of movement of the indicating hand 15 was such as to move the resilient element 25 into engagement with the left hand end of the elongated slot 28. From this point on, continued movement in the counterclockwise direction will rock the direction indicating hand 20 about its pivotal point in a clockwise direction whereupon the indicating hand 15 and the direction indicating hand 20 assume the relative position in which the direction indicating hand is shown in dotted lines in Figure 1. If the indicating hand 15 continues movement in the counterclockwise direction, the resilient element 25 engages the left hand end of the elongated slot 28 and will cause the extension 24 of the direction indicating hand 20 to pass over the convolutions with which it was engaged, into engagement with the next convolution. Also it will be noted that during this movement the inner end of the direction indicating hand 20, which, as shown by the dotted line position in Figure 1, coincides with the lateral extension 31 bearing the legend "Falling," thus indicating that the last movement of the indicating hand 15 was in a counterclockwise direction.

From the foregoing, it will be obvious that the device will at all times automatically indicate the last direction of movement of the indicating hand 15 and this without necessitating manual setting operations. And further that within certain latitudes, the extent of movement may be ascertained.

While manual setting operations are not necessary as above pointed out, means is provided whereby the indicating hand 15 and direction indicating hand 20 may be brought in alinement with each other and the means by which this may be accomplished will now be described.

Assuming that the several parts are in the position in which they are illustrated in Figure 1, and it is desirable to bring the indicating hand 15 and direction indicating hand 20 into alinement with each other, the bezel ring 11 would be grasped and the ring rotated in the clockwise direction until the convolutions of the spring which is engaged by the extension of the direction indicating hand 20, moves into radial alinement with the free outer end of the indicating hand 15, whereupon the bezel ring is brought to rest and the indicating hand 15 and direction indicating hand 20 will be in alinement with each other. Also it will be noted that by movement of the bezel ring 11 and the stops, which, as heretofore stated, are formed by the several convolutions of the coil spring 35, any desired position or adjustment of the indicating hand 15 and the direction indicating hand 20 within the restricted latitude of the pivotal movement of these two members, may be obtained.

In the modified form of the invention, illustrated in Figure 4 of the drawing, I have shown a slightly different construction in which the stops, which are designated 40, are arranged relatively close to the center of the dial and the axis of the indicating hand which is designated 41. The direction indicating hand which is designated 42 is pivotally mounted as at 43 upon the indicating hand 41 and it has a tail piece 44 which engages the stops 40. A spring 45 is attached to the pivot 43 of the direction indicating hand 42 and has its other end positioned between two pins 46 carried by the indicating hand.

By this construction it will be apparent that movement of the indicating hand 41 in either a clockwise or counter-clockwise direction will effect a rocking of the direction indicating hand 42 about its pivotal point 43, moving the indicating hand and the direction indicating hand out of alinement with each other, thereby indicating the direction of the last movement of the indicating hand.

While I have described the invention as applicable to a barometer, it is such that it may be employed in various other instruments and it is to be understood that the invention is not to be limited to use with barometers, but is also capable of use with all types of gauges and indicators.

Furthermore, the stops with which the direction indicating hand engage being movable with respect to the dial and calibrations, permits of many variations of use beyond the scope of barometers and similar pressure indicating instruments or gauges and it is therefore to be understood that the invention is not to be limited to the specific construction and adaptation herein described.

Having thus described my invention, what I claim as new is:

1. Direction indicating means for the indicating hand of a gauge comprising in combination, a suitable support or housing, calibrations carried thereby, an indicating hand mounted on the support or housing for movement in opposite directions relative to the calibrations, a direction indicating hand carried by the indicating hand, said direction indicating hand being movable relatively to the indicating hand and the aforementioned calibrations, and means for holding the direction indicating hand immovable relative to the calibrations during movement of the indicating hand through a predetermined range of movement in either direction of movement of the indicating hand, said means including a plurality of stops carried by the support or housing in the path of movement of the direction indicating hand.

2. Direction indicating means for the indicating hand of a gauge comprising in combination, a suitable support or housing, calibrations carried thereby, an indicating hand mounted on the support or housing for movement in opposite directions relative to the calibrations, a direction indicating hand carried by the indicating hand, said direction indicating hand being movable relatively to the indicating hand and the aforementioned calibrations, and means for holding the direction indicating hand immovable relative to the calibrations during movement of the indicating hand through a predetermined range of movement in either direction of movement of the indicating hand, said means including a plurality of stops carried by the support or housing in the path of movement of the direction indicating hand, said stops being movable relative to the indicating hand, the direction indicating hand and the calibrations whereby to reset the direction indicating hand relative to the indicating hand subsequent to an operation thereof.

3. In an instrument of the type described, a calibrated dial, an indicating hand mounted for pivotal movement relative to the dial and the calibrations thereon, a direction indicating hand pivotally mounted on the indicating hand, a plurality of stationary stops for engagement by the direction indicating hand for rocking it about its pivotal point upon movement of the indicating hand, and means for limiting the extent of pivotal movement of the direction indicating hand relative to the indicating hand.

4. In an instrument of the type described, a calibrated dial, an indicating hand mounted for pivotal movement relative to the dial and the calibrations thereon, a direction indicating hand pivotally mounted on the indicating hand, a plurality of stationary stops for engagement by the direction indicating hand for rocking it about its pivotal point upon movement of the indicating hand, and means for limiting the extent of pivotal movement of the direction indicating hand relative to the indicating hand, said means also permitting of successive engagement of the direction indicating hand with the spaced stops.

5. In an instrument of the type described, a calibrated dial, an indicating hand mounted for pivotal movement relative to the dial and the calibrations thereon, a direction indicating hand pivotally mounted on the indicating hand, a plurality of stationary stops for engagement by the direction indicating hand for rocking it about its pivotal point upon movement of the indicating hand, and resilient means for limiting the extent of pivotal movement of the direction indicating hand relative to the indicating hand and for permitting of yielding engagement of the direction indicating hand with the stops.

6. In an instrument of the type described, a calibrated dial, an indicating hand mounted for pivotal movement relative to the dial and the calibrations thereon, a direction indicating hand pivotally mounted on the indicating hand, a plurality of stationary stops for engagement by the direction indicating hand for rocking it about its pivotal point upon movement of the indicating hand, and resilient means carried by the indicating hand and having engagement with the direction indicating hand to provide yielding engagement of the direction indicating hand with the stops.

7. In an instrument of the class described, a calibrated dial, an indicating hand movable with respect to the dial and the calibrations thereon, means movable relative to the indicating hand for indicating the direction of the indicating hand relative to the dial, and a plurality of spaced stops within the path of movement of the direction indicating means for retarding its movement, said stops being movable relative to the dial, indicating hand and direction indicating means.

MANSFIELD F. HOUSE.